Sept. 3, 1968 J. KURTZ 3,399,908
COUPLING DEVICE FOR PLASTIC-LINED PIPE
Filed Jan. 10, 1966 2 Sheets-Sheet 2

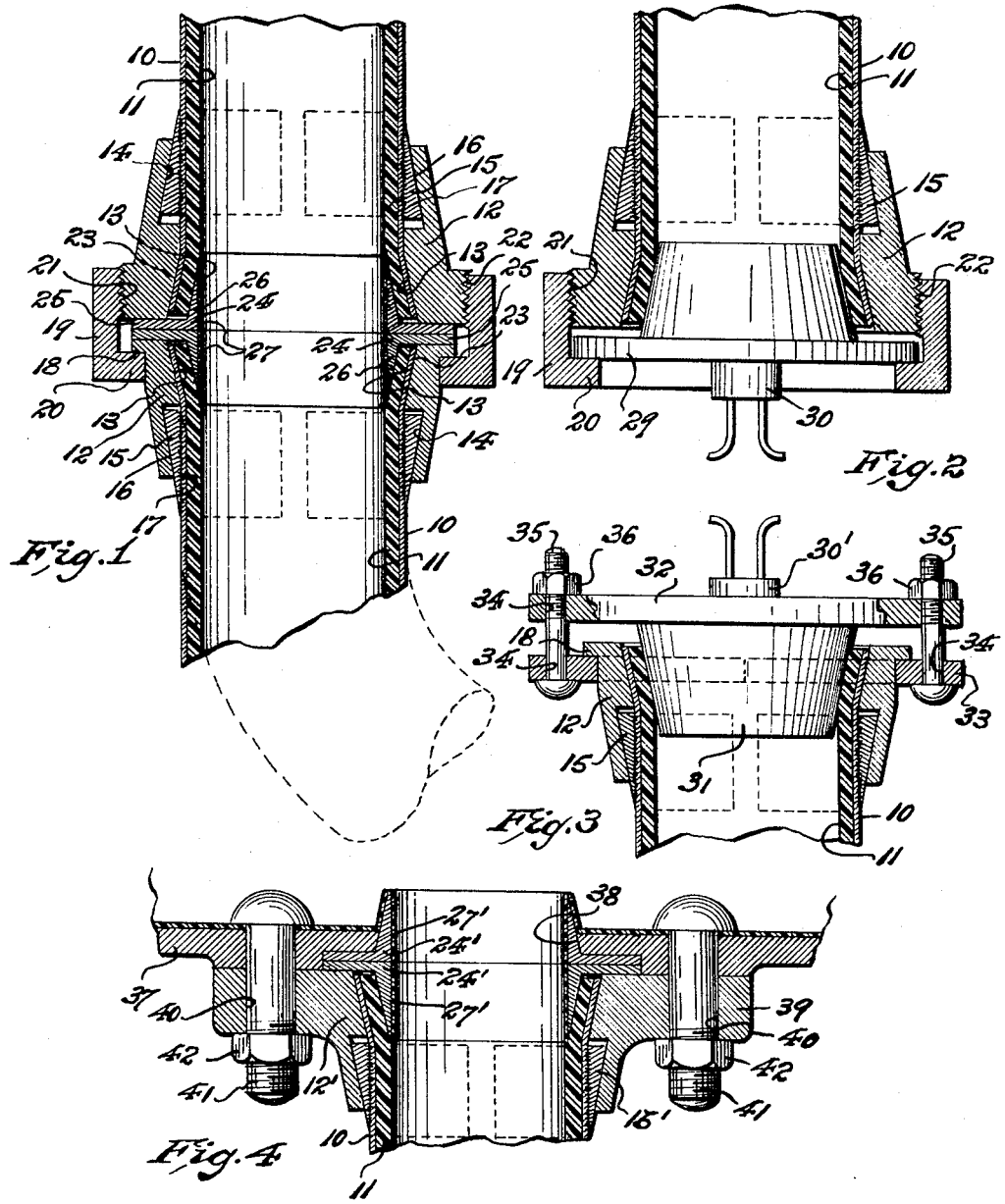

INVENTOR.
John Kurtz,
BY Richards and Cifelli,
Attorneys

United States Patent Office 3,399,908
Patented Sept. 3, 1968

3,399,908
COUPLING DEVICE FOR PLASTIC-LINED PIPE
John Kurtz, 1480 Elaine Terrace, Union, N.J. 07083
Filed Jan. 10, 1966, Ser. No. 519,544
1 Claim. (Cl. 285—55)

ABSTRACT OF THE DISCLOSURE

Devices for coupling thin-walled plastic-lined pipes having outwardly flared open ends include annular metal gaskets having a flange normal to the axes of the pipes, an open passage therethrough lined with plastic, and tapered circumferential flanges to seat within the flared open ends of the lined pipes with the plastic-lined passage of the gaskets in alignment with the plastic lining of the pipes. Split tapered locking collars are disposed around each pipe adjacent the flared ends thereof and engaged by special coupling members drawn together by a union.

---

This invention relates to means for coupling relatively thin wall metal pipes, which are lined with chemically inert material, to one another or to other similarly lined fluid conducting or supply means, under field installing conditions, and wherein the coupling or joining connection per se is also protected by lining of such chemically inert material.

For some time past, relatively thin wall metal pipes lined with chemically inert materials, such as rubber and synthetic plastics, have come into use, particularly under conditions wherein metal pipes alone would be unsuitable due to their lack of resistance to corrosion or other chemical attack. Means and methods for coupling such ready-lined pipes at the field of use have been heretofore suggested, but have, in most cases, involved installing procedures difficult to carry out in the field, and have required complicated coupling connections.

It is a primary object of the present invention to provide an improved form of coupling connection for joining prelined, relatively thin wall metal pipes one to another, or to other similarly lined fluid conducting or supply means, which can be easily and quickly installed at the field of use.

It is a further object of the present invention to provide a comparatively inexpensive lined coupling connection of great strength and very simple construction, involving but a minimum number of parts, and so designed as to continue with the lined pipe in such manner as to prevent deformation or rupture thereof or other damage thereto, both during and after installation, and so as to assure a leak-proof joint in use.

It is a further object of the present invention to provide an improved coupling connection that is especially well adapted for use in joining prelined thin wall metal pipe produced from relatively hard metals, such as aluminum, steel, stainless steel and the like.

It is still another object of the present invention to provide a coupling connection, for the purposes stated, which can be installed at the field of use by relatively unskilled workmen employing only conventional wrenches and easily manipulated flaring tools.

Still another object of the present invention is to provide a coupling connection, for the purposes stated, which is well adapted to be employed in conjunction with any conventional pipe fitting, such as flanges, elbows, tees, valves and the like.

The present invention resides in providing a device for coupling thin-walled plastic-lined pipes with flared ends, including first and second coupling means mounted around the pipes in engagement with locking collars affixed to said pipes by constrictive forces; the coupling members and locking collars having complementary interlocking tapered portions. Plastic-lined annular metal gaskets are provided, intermediate the ends of the pipes to be coupled, with radial flanges normal to the axes of the pipes and tapered circumferential flanges in contact with the flared inner surfaces of the ends of the pipes, and with the plastic-lined passage through the annular flanges in alignment with the linings of the pipes to be coupled. The first coupling member is provided with a radial flange and adjacent seating surface to engage a union, and the second coupling member has an enlarged annular forward end threaded circumferentially externally to engage internal threads in the union to permit the coupling members and pipes to be drawn together against the intermediate gaskets.

The above and other objects of this invention will be understood from a reading of the following description of illustrative embodiments thereof shown in the accompanying drawings, in which:

FIG. 1 is a longitudinal sectional view of a coupling connection according to this invention as operative to adjoin two sections of lined pipe;

FIG. 2 is a longitudinal sectional view, showing a pipe flaring plug operated by means of the female coupling element of one coupling member of the coupling connection of FIG. 1;

FIG. 3 is a longitudinal sectional view, showing a pipe flaring plug operated by heavy duty flanges in association with the other coupling member of the coupling connection of FIG. 1;

FIG. 4 is a longitudinal sectional view of a modified form of coupling connection according to this invention, and operative to join a lined pipe to a fluid supply tank or the like;

Like characters of reference are applied in the several figures of the drawings to identify corresponding parts.

Figure 5:
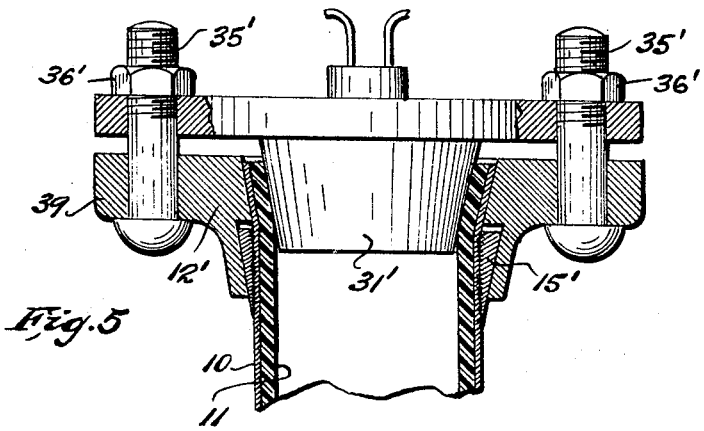
FIG. 5 is a longitudinal sectional view, showing a pipe flaring plug adapted to be operated in association with the modified form of coupling connection of FIG. 4.

Referring first to FIG. 1 of the drawings, the same shows a complete coupling connection, according to this invention, as applied to opposed ends of internally lined sections of metal pipe 10 to be joined in coupled together relation. Said pipe sections 10 each are provided with plastic linings 11, which are bonded to the interior surface thereof. Telescopically engaged over and surrounding the end portions of the respective pipe sections 10, are respective endwise open coupling members 12, each of which, together with their linings 11, is formed internally to provide forwardly and outwardly inclined or flared annular seating surfaces 13. The rearward end portions of said respective coupling members 12 are each formed to provide rearwardly open and inwardly inclined or tapered annular cavities 14. These cavities 14 are adapted to embrace respective tapered split locking collars 15, the external rearwardly and inwardly inclined surface 16 of which are slidingly engaged by the internal inclined surfaces of the cavities 14. These respective locking collars 15 surround and engage the respective lined pipe sections 10 in spaced back relation to the ends of the latter, and rearwardly of the flared seating surfaces 13 of the coupling members mounted thereof. The internal surface 17 of each split locking collar 15 is suitably roughened, as by threads, knurling or the like, thus providing frictional surfaces adapted to firmly grip the opposing surfaces of the pipe sections 10, when constricted about the latter. Said locking collars 15 being circumferentially discontinuous or split, are contractible, whereby to be forced into strong gripping relation to the pipe sections 10, as will be later herein explained.

One coupling member 12 is provided at its forward or free end with a radially projecting, circumferential flange, that forms an external shoulder 18. Rotatably mounted on this coupling member 12 is a female union member 19, the rearward end of which is provided with an internal circumferential flange 20 adapted to engage said external shoulder 18 of said coupling member 12. The forward interior end of said union member 19 is provided with internal screw threads 21. The other, or opposed, coupling member 12 is provided at its forward or free end with external screw threads 22, adapted to be engaged by the internal screw threads 21 of the union member 19, whereby to unite the two coupling members 12 in drawn together connection relation, and thus, in use, to couple the lined pipe sections 10-11 one to the other.

The opposed ends of the lined pipe sections 10-11 to be joined are outwardly flared as at 23, whereby to cause the end portions thereof to engage contiguously with the correspondingly inclined internal seating surfaces 13 of the respective coupling members 12. Inserted in these respective flared end portions 23 of the respective lined pipe sections 10-11 are metal gaskets 24, each comprising lateral radial flanges 25, normal to the axes of said pipe sections, and circumferential tapered flanges 26, the internal bores of which are parallel to the axes of said pipe sections. The external angular inclined faces of the flanges 26 respectively conform to and engage the angular faces of the flared end portions 23 of said lined pipe sections. These metal gaskets 24 are lined or faced, essentially upon their internal axial surfaces, with coatings 27 of inert plastic material, or preferably coated on all surfaces as by dipping to encapsulate the entire gasket 24. The internal coated surfaces of said gaskets 24 are of the same internal diameter as the internal diameters of the lined pipe sections 10-11, whereby to be flush with the latter, and thus to provide aligned surfaces along the interior of the coupling connection, so that no restriction of fluid flow through the coupling connection and the adjoined lined pipe sections 10-11 is involved.

In the manipulation of the coupling structure above described, whereby to join opposed ends of the lined pipe sections 10-11, the female union member 19 on the one coupling member is engaged with the screw-threaded end 22 of the other opposed coupling member. Thereupon, by turning said union member 19 the coupling members 12 are axially moved one toward the other, thus drawing together the opposed ends of the lined pipe sections 10-11, with their contained gaskets 24, into tightly closed meeting relation, thereby assuring a strong and leak proof coupling joint.

An effect of the above described manipulation of the coupling structures is to cause the inclined surfaces of the cavities 14 of the coupling members 12 to slidingly draw against the inclined faces 16 of the respective split locking collars 15, whereby to radially compress or constrict the latter, so that their roughened internal surfaces 17 will bite into the external surfaces of the lined pipe sections 10-11, and thus firmly grip and interlock therewith, to thereby firmly and immovably bind the coupling members respectively to the respective meeting end portions of the pipe sections, in affixed relation thereto.

Figure 6:
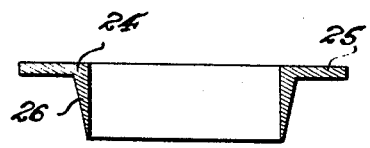
FIG. 6 is a cross sectional view of a metal gasket element employed in a coupling connection according to this invention, the same being shown before coating desired surfaces thereof with inert lining material.
Figure 7:
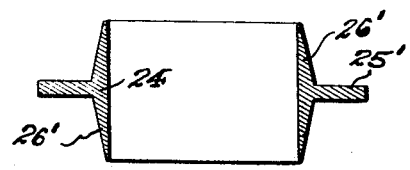
FIG. 7 is a similar view showing a modified form of such metal gasket element, also before coating thereof with inert lining material.
Figure 8:
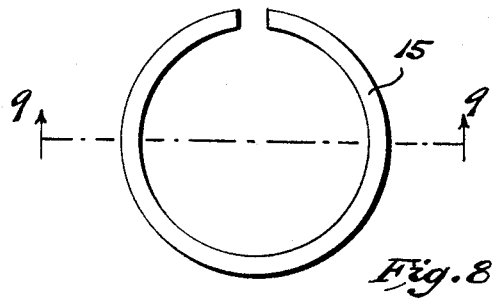
FIG. 8 is an end elevational view of a tapered split locking collar employed in a coupling connection of this invention.
Figure 9:
FIG. 9 is a longitudinal sectional view thereof, taken on line 9—9 in FIG. 8.

The plastic coated metal gaskets 24 may be in individual form for respective application to the flared end portions of the respective lined pipe sections 10-11 (see FIG. 6); or they may be combined in a one-piece formation (see FIG. 7) to comprise an intermediate radial flange 25' and oppositely axially projecting tapered flanges 26'.

The flaring 23 of end portions of the lined pipe sections 10-11 may be effected, when the latter are of relatively light or thin type, merely by drawing together of the coupling members 12, and interposed gaskets 24, by the above described coupling structure manipulation.

When, however, heavier types of lined pipe sections 10-11 are to be joined in the field, especially those wherein the lining 11 is deformable only with difficulty when cold, it is desirable to provide means for flaring such end portions of the lined pipe sections in advance of joining the coupling members in coupling relation, which means can be readily operated during installation of a coupling connection at the field of use. Illustrative of means for effecting such advance or preparatory flaring of the lined pipe sections 10-11, reference is invited to FIGS. 2 and 3 of the drawings. In FIG. 2 is shown an illustrative type of means for flaring the lined pipe section to which is applied the coupling member having the male screw-threaded end 22. This means comprises a conical flaring plug 28 having a circumferential radial base flange 29. Said plug 28 is opposed to the open end of the lined pipe section 10-11 which is to be flared, whereupon the union member 19 is passed over said plug so as to engage the latter's base flange 29, and thereupon screwed onto the threaded end 22 of the coupling member. By screwing home the union 19, said plug 28 is forced into the end of the lined pipe section, with expanding and flaring effect thereupon. If the inert lining 11 of the metal pipe section 10 is resistant to desired flaring expansion when cold, the plug 28 can be provided with an electrical heating element 30, adapted to facilitate the flaring operation by softening said lining 11. In FIG. 3 is shown an illustrative type of means for flaring the other lined pipe section. This means also comprises a conical flaring plug 31 having a circumferential radial base flange 32. This plug 31 is opposed to an open end of said other lined pipe section whereupon an annular pull ring 33 is mounted on the coupling member 12 which has the flange forming the shoulder 18, and in such manner as to engage behind said shoulder. This pull ring 33 is preferably in opposed separable parts, so that the same can be mounted on and around the coupling member 12, without necessity for passing the same over the length of the lined pipe section to be flared. The flange 32 of the plug 31 and the pull ring 33 are respectively provided with aligned bolt openings 34, through which are passed draw bolts 35 equipped with nuts 36. When the nuts 36 are turned home on said bolts 35, the plug 31 is forced into the end of the lined pipe section 10-11 which said coupling member surrounds, thus expanding and flaring said end portion of the lined pipe section 10 is resistant to desired flaring expansion when cold, the plug 31 can be provided with an electrical heating element 30, adapted to facilitate the flaring operation.

There are occasions when it is required to couple a lined pipe section 10-11 to other than another such section, as e.g. to a fluid supply tank or other fluid control structure. In such case, but a single coupling member is required. Referring now to FIG. 4, a coupling arrangement, modified to serve such purpose, is shown, wherein a wall 37 of a tank or the like is provided with an outlet opening 38 to which a lined pipe section 10-11 is to be connected. Said outlet opening 38 is shaped to receive a lined gasket 24'-27'. A single coupling member 12' is mounted on a lined pipe section 10-11, which, in essentials, is the same as previously above described, including a split locking collar 15' and a lined gasket 24'-27'. At its forward end, this coupling member 12' is provided with a radially projecting circumferential flange 39 of enlarged diameter and suitable thickness. This flange 39 is provided with bolt passage openings 40. Suitably affixed to and projecting exteriorly from the wall 37 of the tank or the like, are threaded studs or bolts 41, which can be passed through the openings 40 of the coupling members flange 39, whereby to connect the coupling member 12' to said tank or the like. On said studs or bolts 41 are nuts 42. When the nuts 42 are turned home on the studs or bolts 41, the coupling member 12', and its associated parts, are coupled to the tank or the like (again see FIG. 4).

If advance flaring of the lined pipe section 10-11 is desired such flaring can be accomplished by application of a flaring plug 31', similar to that shown in FIG. 3, and connected to the flange 39 of the coupling member 12' by means of draw bolts 35' having nuts 36' (see FIG. 5).

From the above, it will now be obvious, that this invention provides a very simple coupling structure for the purposes set forth, and one which is of easy installation at the field of use, involving but a limited number of parts, and therefore of comparatively inexpensive cost.

I claim:

1. In a coupling device for connecting together the opposed outwardly flared ends of two relatively thin-walled metal pipes, each having an internal lining of inert material; said device including first and second coupling members respectively mounted around said pipes adjacent the flared ends thereof, each coupling member having an internally flared outer opening to receive and seat one of the flared open ends of the respective lined pipes, a pair of split tapered locking collars, each collar mounted around one of said lined pipes inwardly adjacent the flared portion thereof, each coupling member having a correspondingly tapered annular cavity to receive and embrace the respective locking collars, annular metal gasket means with an open axial passage therethrough, having a lining of inert material over at least the internal surfaces thereof, said gasket means having a radial flange normal to the axis of the lined pipes when the gasket is in operative position and respective tapered circumferential flanges to seat within the respective flared open ends of said lined pipes, and means to draw the coupling members and interposed gasket means into closed connected relation with the opposed lined pipe ends and to constrict the locking collars into binding fixed relation to the respective lined pipes; the improvement wherein: said first coupling member has a radially projecting flange having forward and rearward surfaces normal to the axis of said pipe and an annular external seating surface adjacent the rear surface of said flange; said second coupling member has an annular internal seating surface having a diameter approximately the same as the external diameter of said pipe to provide a close sliding fit between said pipe and the seating surface of said second coupling member, said seating surface being disposed between the internally flared outer opening and tapered annular cavity of said second coupling member and immediately adjacent said flared outer opening, the forward portion of said second coupling member having a larger diameter than said first coupling member and being threaded externally adjacent the forward end thereof, the forward end of said second coupling member being normal to the axis of said pipe; and wherein the means for drawing said coupling members together is a union rotatably mounted on said first coupling member and having an annular collar portion for engaging the radial flange of said first coupling member and seating against said external seating surface thereon, and an internally threaded portion for engaging the externally threaded portion of said second coupling member; the tapered circumferential flanges of said gasket means being proportioned to substantially completely occupy the space between the normal inside diameter of said lined pipe and the enlarged diameter of said pipe and within the flared portions of said pipes, the lining of the passage through said gasket being flush with the adjacent lining of said pipes.

References Cited
UNITED STATES PATENTS

| | | | |
|---|---|---|---|
| 1,139,821 | 5/1915 | Sundh | 285—334.2 |
| 1,589,729 | 6/1926 | Weiler | 285—368 X |
| 1,885,779 | 11/1932 | Stewart | 285—343 X |
| 2,269,629 | 1/1942 | Kreeidel | 285—342 X |
| 2,549,741 | 4/1951 | Young | 285—334.5 |
| 2,585,453 | 2/1952 | Gallagher et al. | 285—341 |
| 2,937,038 | 5/1960 | Gondek | 285—368 X |
| 3,199,879 | 10/1965 | Fleming | 285—55 X |
| 3,228,096 | 1/1966 | Albro | 285—55 X |

EDWARD C. ALLEN, *Primary Examiner.*

R. G. BERKLEY, *Assistant Examiner.*